United States Patent Office 3,117,940
Patented Jan. 14, 1964

3,117,940
METHOD OF DISSOLVING POLYURETHANES
Wilbur R. McElroy, Hillside, New Martinsville, W. Va., assignor to Mobay Chemical Company, Pittsburgh, Pa., a corporation of Delaware
No Drawing. Filed Nov. 14, 1960, Ser. No. 68,618
11 Claims. (Cl. 260—2.3)

This invention relates to a method of dissolving polyurethanes and more particularly to a method of dissolving polyurethanes in active hydrogen containing compounds to prepare improved solutions containing scrap or waste polyurethane plastics which are suitable for the preparation of new and useful materials.

It has been proposed heretofore in U.S. Patent 2,937,151 to dissolve a cellular polyurethane plastic prepared from a linear polyester and an organic polyisocyanate in a liquid active hydrogen containing polymeric material by heating a mixture of the cellular polyurethane and the liquid material which has free hydroxyl groups. As stated in the patent, temperatures above about 250° C. result in discoloration of the solution of polyurethane plastics. If temperatures above 250° C. are avoided in the process of the patent, it is necessary to heat the polyurethane for such long periods of time that the process is impractical commercially. Moreover, the resulting solutions of polyurethanes in organic compounds which contain terminal hydroxyl groups are often cloudy and the polyurethane is only partially solubilized.

It is, therefore, an object of this invention to provide an improved method of liquefying polyurethane plastics. Another object of this invention is to provide organic compounds which will bring about liquefaction of polyurethane plastics at a lower temperature than heretofore possible. Still a further object of this invention is to provide a method for the liquefaction of polyurethane plastics in a shorter time than heretofore possible without discoloration of the resulting mixture of polyurethane and organic compound. A further object of this invention is to provide a method of reclaiming polyurethane waste products. Another object of the invention is to provide a method of reclaiming cellular polyurethane plastics. Still another object of this invention is to provide a method of using scrap polyurethane plastics to make new and useable products.

The foregoing objects and others which will become apparent from the following description are accomplished in accordance with the invention, generally speaking, by providing a method of liquefying polyurethane plastics which comprises heating the polyurethane in a primary amine to a temperature of at least about 70° C. The invention, therefore, provides for the liquefaction of a polyurethane plastic in organic compounds which contain one or more and preferably at least two free primary amino groups.

Any suitable primary amine may be used in accordance with the process of the present invention including aromatic aliphatic and heterocyclic primary mono- and/or polyamines as well as organic polymers which contain free primary amino groups. For example, aniline, 2,4- and 2,6-toluylene diamine, m-toluidine, 2,3-xylidine, 1-naphthylamine, o - phenylene diamine, 1,4-naphthylene diamine, 1,2,3 - benzene triamine, 3,3'-biphenylene diamine, 3,4 - biphenylene diamine, 4,4'-diphenyl methane diamine, ethyl amine, propyl amine, ethylene diamine, propylene diamine, 1,6-hexylene diamine, benzyl amine, 2 - phenyl ethyl amine, butylene diamine, pentylene diamine, diethylene triamine, triethylene tetramine, tetraethylene pentamine, N - coco - 1,3-propylene diamine, 2-amniopyrol, furfurylamine, 2,6-diamino pyridine, 2,4-diamino - 5 - amino methyl pyrimidine, 2,5-diamino-1,3,4-thiadiazole and the like are applicable. Any suitable organic compound containing free amino groups may, therefore, be used including polymers which are obtained from dimerized fatty acids such as dimerized linoleic acid with lower aliphatic polyamines such as ethylene diamine or diethylene triamine so that the final product will have free amino groups. A suitable process for the manufacture of polyamide resins having free amino groups is disclosed in U.S. Patent 2,450,940, which issued October 12, 1948, to John C. Cowan et al. A particularly suitable polyamide resin is the condensation product of dimerised linoleic acid and diethylene triamine which has an equivalent weight per amine value of from about 210 to about 230 and a viscosity of about 500 to about 750 poises at 40° C. One may also use polyalkylene glycol amines such as polyethylene glycol amine made by condensing polyalkylene glycols with acrylonitrile followed by reduction to the amine.

The polyurethane plastics may be any suitable polyurethane obtained from an organic compound containing at least two active hydrogen containing groups as determined by the Zerewitinoff method and an organic polyisocyanate. The polyurethanes may be cellular or noncellular and may be obtained by any well known process including those disclosed in U.S. Reissue Patent 24,514 or U.S. Patents 2,729,618 and 2,621,166. The solid polyurethane is preferably subdivided and then added to the hot amine. In the interest of speeding up the process, temperatures above about 125° C. are preferred and it is seldom necessary to heat the polyurethane in the amine to a temperature above about 220° C. in order to achieve substantially complete liquefaction of the polyurethane in the amine. The amount of time necessary to obtain complete solubilization varies somewhat from one system to another depending on the degree of cross-linking in the polyurethane, the degree of subdivision, the temperature, the amount of agitation, the surface area and so forth. Where a high degree of cross-linking is present, as in a rigid cellular polyurethane plastic, the amount of time necessary to bring about liquefaction may be as much as several hours, whereas those polyurethanes which are not so highly cross-linked can be dissolved in a relatively short time. Large pieces of material require considerable time to dissolve whereas the smaller pieces for example, those measuring less than about one inch in any direction through the center of the piece, will dissolve in a very short time. Where cellular polyurethane plastics are to be dissolved in a resin, the time required for liquefaction will vary depending primarily on the degree of wettability of the cellular polyurethane. The best results are obtained by heating a solid polyurethane in a liquid amine at a temperature within the range of from about 125° C. to about 220° C.

In accordance with a preferred embodiment of this invention, the polyurethane is heated in the primary amine in the presence of a tertiary amine catalyst such as, for example, triethylene diamine, N-ethyl morpholine, N-methyl morpholine, N-coco morpholine, 1-methyl-4-dimethyl amino ethyl piperazine and the like.

The resulting resins are useful as plasticizers, for example, in the preparation of moldings, coatings for wood, metal and the like, in the preparation of cellular polyurethane plastics, in adhesive compositions and the like.

The invention is further illustrated by the following examples in which the parts are by weight unless otherwise indicated.

*Example 1*

A cellular polyurethane plastic is prepared as follows: About 100 parts of a trihydric polyalkylene ether prepared from about 1 part of glycerine and about 30 parts of propylene oxide by condensation thereof to a molecular weight of about 3000 and having an hydroxyl number of about 56 are mixed with about 40 parts of a mixture of 80 percent 2,4- and 20 percent 2,6-toluylene diisocyanate, about 0.35 part of stannous octoate, about 0.35 part N-ethyl morpholine, about 0.05 part of 1-methyl-4-dimethyl amino ethyl piperazine, about 1 part of a silicone oil having the formula

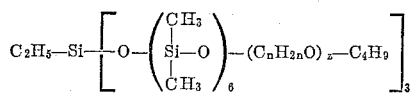

wherein ($C_nH_{2n}O$) represents about 17 oxyethylene units and about 13 oxypropylene units and $z$ is equal to about 30 are also mixed with the other ingredients substantially simultaneously, and about 3.2 parts of water are mixed in an injection mixer as described in U.S. Reissue Patent 24,514. The resulting cellular polyurethane plastic has the following physical properties:

| | |
|---|---|
| Density _____ lbs./ft.$^3$ ____ | 2 |
| Tensile strength _____ lbs./in.$^2$ ____ | 17 |
| Elongation _____ percent ____ | 280 |

*Example 2*

About 20 parts of the cellular polyurethane plastic prepared in Example 1 are added to about 100 parts of the condensation product of dimerized linoleic acid and diethylene triamine which has an amine value of from about 210 to about 230 and a viscosity of about 500 to about 750 poises at 40° C. The cellular polyurethane had previously been cut into pieces about one-half by one-half by four inches. It dissolved almost immediately to give a clear solution at about 165°–170° C.

*Example 3*

About 1 part of the cellular polyurethane plastic prepared in Example 1 is added to about 2 parts of the condensation product of linoleic acid and diethylene triamine employed in Example 2, in the presence of triethylene diamine. The resulting mixture is heated to a temperature of about 150° C. and a viscous solution results. Upon cooling the resulting mass sets to a rubbery consistency and yields a material which is used to bond polyurethane rubber to polyurethane rubber, cellular polyurethane plastic to cellular polyurethane plastic and the like as a pressure sensitive adhesive applied by simply spreading the warm material onto one surface and pressing the surface to be bonded thereto against it.

In these examples, Examples 4 through 8, set out in the following table, about 5 parts of the cellular polyurethane plastic of Example 1 are heated together with about 20 parts of the amines listed in the table for about 15 hours to the maximum temperature ranges given in the table at which point at least partial solubilization of the cellular polyurethane occurs.

| Example | Amine | Temperature, °C. | Condition at treatment temperature | Condition at room temperature |
|---|---|---|---|---|
| 4 | aniline | 70 | partly soluble | part liquid |
| 5 | do | 190 | completely soluble | liquid |
| 6 | triethylenetetramine | 110 | soluble clear liquid | low viscosity clear liquid |
| 7 | 80% 2,4- and 20% 2,6-toluylene diamine | 150 | completely dissolved | soft solid |
| 8 | 4,4'-methylene bis-(2-chloroaniline) | 190 | liquid | tacky solid |

It is to be understood that any other suitable polyurethane, polyamide or the like could have been used in the preceding examples with equally satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of liquefying a solid polyurethane plastic which comprises heating the same with a primary amine to a temperature of at least about 70° C. and continuing said heating until said solid polyurethane plastic is liquid.

2. The method of claim 1 wherein the temperature is in the range of from about 125° C. to about 220° C.

3. The method of claim 1 wherein said polyurethane plastic is a cellular polyurethane plastic.

4. The method of liquefying a solid cellular polyurethane plastic which comprises heating the same with a primary amine obtained by the condensation of dimerized fatty acids with lower aliphatic polyamines to a temperature of at least about 70° C. and continuing said heating until said cellular polyurethane plastic is liquid.

5. The method of claim 1 wherein said polyurethane and said primary amine are mixed with a tertiary amine catalyst and heated to a temperature of at least about 70° C.

6. A method of liquefying a solid polyurethane plastic which contains urethane groups in the linear chain which comprises heating the same with a primary amine to a temperature of at least about 70° C. and continuing said heating until said solid polyurethane plastic is liquid.

7. The method of claim 6 wherein said primary amine is triethylene tetramine.

8. The method of claim 6 wherein said primary amine is toluylene diamine.

9. The method of claim 6 wherein said primary amine is 4,4'-methylene bis-(2-chloroaniline).

10. The method of claim 4 wherein said dimerized fatty acid is dimerized linoleic acid.

11. The method of claim 1 wherein said polyurethane plastic is a cellular polyurethane plastic obtained by a process which comprises reacting an organic polyisocyanate with an organic compound containing at least two active hydrogen containing groups as determined by the Zerewitinoff method in the presence of a blowing agent.

References Cited in the file of this patent

UNITED STATES PATENTS

| | | |
|---|---|---|
| 2,621,166 | Schmidt et al. | Dec. 9, 1952 |
| 2,937,151 | Ten Broeck | May 17, 1960 |
| 3,007,883 | Schmidt et al. | Nov. 7, 1961 |
| 3,043,786 | White | July 10, 1962 |

FOREIGN PATENTS

| | | |
|---|---|---|
| 805,561 | Great Britain | Dec. 10, 1958 |
| 822,446 | Great Britain | Oct. 28, 1959 |

OTHER REFERENCES

Rubber Age, volume 81, No. 5, August 1957, "Effects of Foaming Catalyst on Hydrolysis-Aging of Urethane Foams," by J. Winkler.